United States Patent
Sugiyama et al.

(10) Patent No.: US 10,352,368 B2
(45) Date of Patent: Jul. 16, 2019

(54) PROPELLER SHAFT AND CONSTANT-VELOCITY JOINT USED IN SAID PROPELLER SHAFT

(71) Applicant: Hitachi Automotive Systems, Ltd., Hitachinaka-shi, Ibaraki (JP)

(72) Inventors: Kenichi Sugiyama, Atsugi (JP); Yasutomo Mabe, Zama (JP); Toshiyuki Masuda, Atsugi (JP); Hiromichi Komai, Hadano (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 24 days.

(21) Appl. No.: 15/123,863

(22) PCT Filed: Feb. 6, 2015

(86) PCT No.: PCT/JP2015/053343
§ 371 (c)(1),
(2) Date: Sep. 6, 2016

(87) PCT Pub. No.: WO2015/137025
PCT Pub. Date: Sep. 17, 2015

(65) Prior Publication Data
US 2017/0016484 A1    Jan. 19, 2017

(30) Foreign Application Priority Data

Mar. 10, 2014 (JP) ................. 2014-045816

(51) Int. Cl.
*F16D 3/223* (2011.01)
*F16D 1/06* (2006.01)

(52) U.S. Cl.
CPC ............ *F16D 3/223* (2013.01); *F16D 1/06* (2013.01); *F16D 2003/22326* (2013.01); *Y10S 464/906* (2013.01)

(58) Field of Classification Search
CPC .. F16D 1/06; F16D 3/223; F16D 2003/22326; Y10S 464/906
(Continued)

(56) References Cited

U.S. PATENT DOCUMENTS

| 4,668,111 A | * | 5/1987 | Kapaan | ............... | B60B 27/0005 |
| | | | | | 464/906 |
| 6,012,986 A | * | 1/2000 | Guimbretiere | ...... | B60B 27/0005 |
| | | | | | 464/906 |

(Continued)

FOREIGN PATENT DOCUMENTS

| JP | 6-280887 A | 10/1994 |
| JP | 6-87731 U | 12/1994 |

(Continued)

OTHER PUBLICATIONS

International Search Report (PCT/ISA/210) issued in PCT Application No. PCT/JP2015/053343 dated Apr. 7, 2015 with English-language translation (four (4) pages).

(Continued)

*Primary Examiner* — Greg Binda
(74) *Attorney, Agent, or Firm* — Crowell & Moring LLP (57) ABSTRACT

The first constant-velocity joint has an inner ring member, an outer ring member housing the inner ring member, and balls, which are installed in raceway grooves formed at prescribed intervals in a circumferential direction in the outer ring member and which extend along an axial direction, for transmitting rotational torque between the inner ring member and the outer ring member. Furthermore, the constant-velocity joint is formed so that one of the inner ring member and the outer ring member connects to an attaching member installed to a vehicle side with a spline, and so that the other of them connects to a power transmission shaft. In outside wall of the outer ring member, an engagement groove is formed so as to engage with an engagement member applied (Continued)

to connection or release thereof in a range avoiding positions corresponding to the raceway grooves in an axial direction or a circumferential direction.

15 Claims, 11 Drawing Sheets

(58) Field of Classification Search
USPC .................................................. 464/144–146
See application file for complete search history.

(56) References Cited

U.S. PATENT DOCUMENTS

| | | | |
|---|---|---|---|
| 6,286,909 B1* | 9/2001 | Mizukoshi | F16C 33/768 |
| 7,008,327 B2* | 3/2006 | Kuczera | F16D 3/2055 |
| | | | 464/146 |
| 8,197,349 B2* | 6/2012 | Terada | F16D 3/227 |
| | | | 464/906 |

FOREIGN PATENT DOCUMENTS

| | | |
|---|---|---|
| JP | 2011-225153 A | 11/2011 |
| JP | 2012-17767 A | 1/2012 |

OTHER PUBLICATIONS

Japanese-language Written Opinion (PCT/ISA/237) issued in PCT Application No. PCT/JP2015/053343 dated Apr. 7, 2015 (four (4) pages).

\* cited by examiner

PROPELLER SHAFT AND CONSTANT-VELOCITY JOINT USED IN SAID PROPELLER SHAFT

TECHNICAL FIELD

The present invention relates to, for instance, a propeller shaft for an automobile and a constant-velocity joint used in the propeller shaft.

BACKGROUND ART

The propeller shaft is generally divided into two or three by a drive shaft which is connected to a vehicle side (transmission side) and a driven shaft which is connected to a differential gear side. Furthermore, with joint structures such as a cardan joint, a constant-velocity joint (for example, Patent Document 1), etc. installed in opposite ends of the divisions, the propeller shaft is rotatably supported by support equipment which is installed almost in the center of an axial direction.

PRIOR ART DOCUMENT

Patent Document

Patent Document 1: Japanese Patent Application Publication 2011-225153

SUMMARY OF THE INVENTION

In a conventional constant-velocity joint, an engagement groove is formed at a position which overlaps with a raceway groove of an outer ring member. The engagement groove engages with an engagement member which is used in assembling a propeller shaft. The formation of the engagement groove requires that the member is thickened in order to get strength of the outer ring member, so there is a rick of causing increase in weight of the constant-velocity joint.

It is therefore a problem to be solved in the present invention to suppress increase in weight while securing strength of the constant-velocity joint in view of the above circumstances.

Accordingly, a constant-velocity joint of the present invention includes an inner ring member; an outer ring member which houses the inner ring member; and intermediate members which are installed in raceway grooves that are formed at prescribed intervals in a circumferential direction in the outer ring groove, and that extend along an axial direction, and which are capable of transmitting rotational torque between the inner ring member and the outer ring member. Furthermore, the constant-velocity joint is configured so that one of the inner ring member and the outer ring member connects to an attaching member, which is installed in a vehicle side, with a spline, and so that the other of them connects to a power transmission shaft. An outside wall of the outer ring member has an engagement groove. The engagement groove is configured so as to engage with an engagement member, which is applied to the above connection or release thereof, in a range avoiding positions corresponding to the above raceway grooves in an axial or circumferential direction.

According to the above present invention, it is possible to suppress increase in weight while securing strength of the constant-velocity joint.

DESCRIPTION OF THE EMBODIMENTS

Respective embodiments of the present invention are hereinafter explained in detail with reference to the drawings.

[First Embodiment]

A constant-velocity joint in the first embodiment of the present invention will be explained with reference to FIG. 1 to FIG. 4. This mode is what is applied to a propeller shaft for a vehicle.

Figure 1:
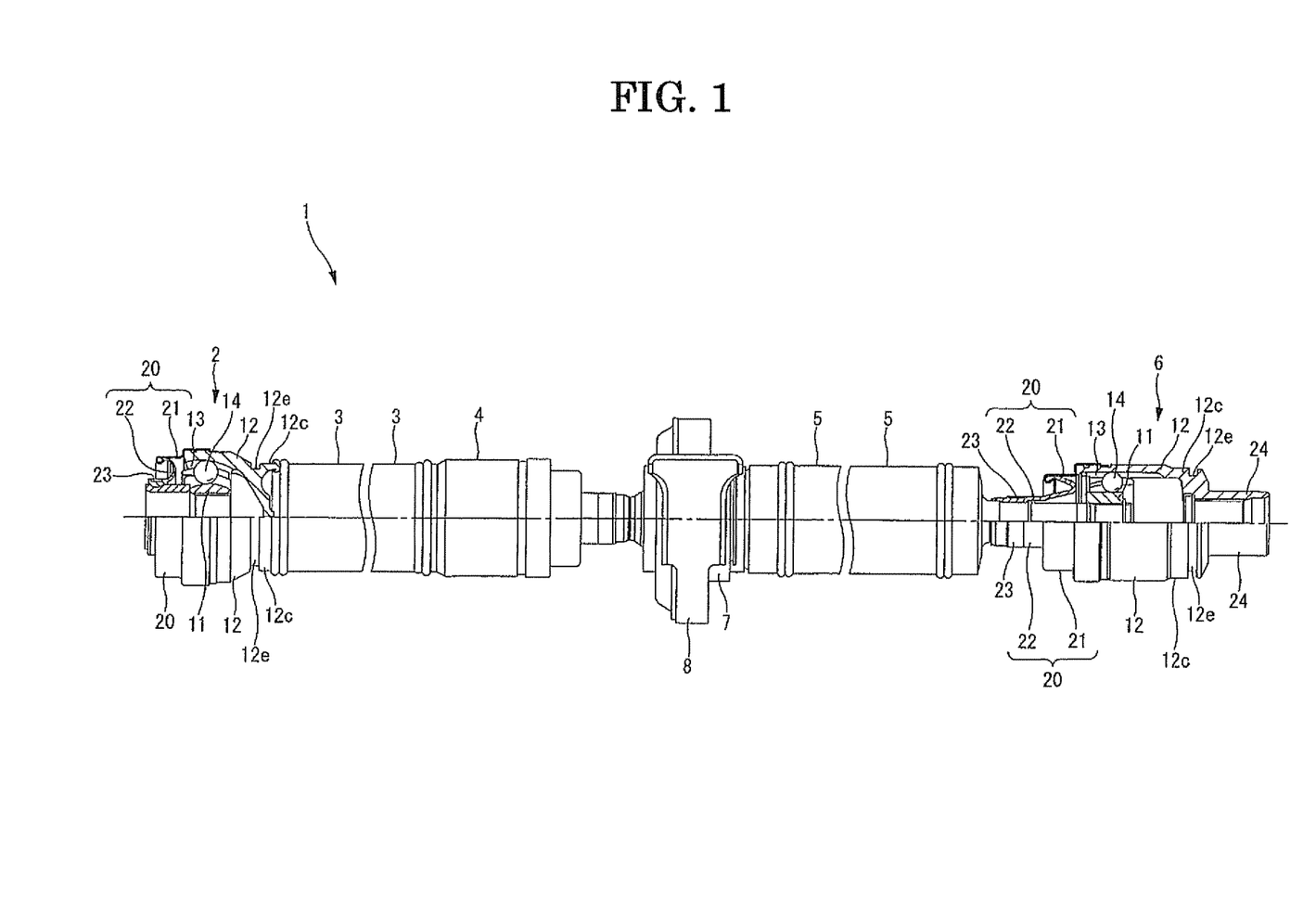
FIG. 1 is a side view of the propeller shaft, which shows a partial section of the constant-velocity joint in the first embodiment according to the present invention.

As shown in FIG. 1, a propeller shaft 1 is equipped with a drive shaft 3 linked to an input shaft (not shown), which is connected to a transmission, through a first constant-velocity joint 2; a driven shaft 5 linked to the drive shaft 3 through a second constant-velocity joint 4; an output shaft (not shown) being in a differential gear side and linked to the driven shaft 5 through a third constant-velocity joint 6; and a center bearing 7 supported to a car body (not shown) through a bracket 8 installed near the second constant-velocity joint 4. The drive shaft 3 and the driven shaft 5 are made of aluminum alloy. The input shaft and the output shaft are made of iron-based metal.

Figure 2A:
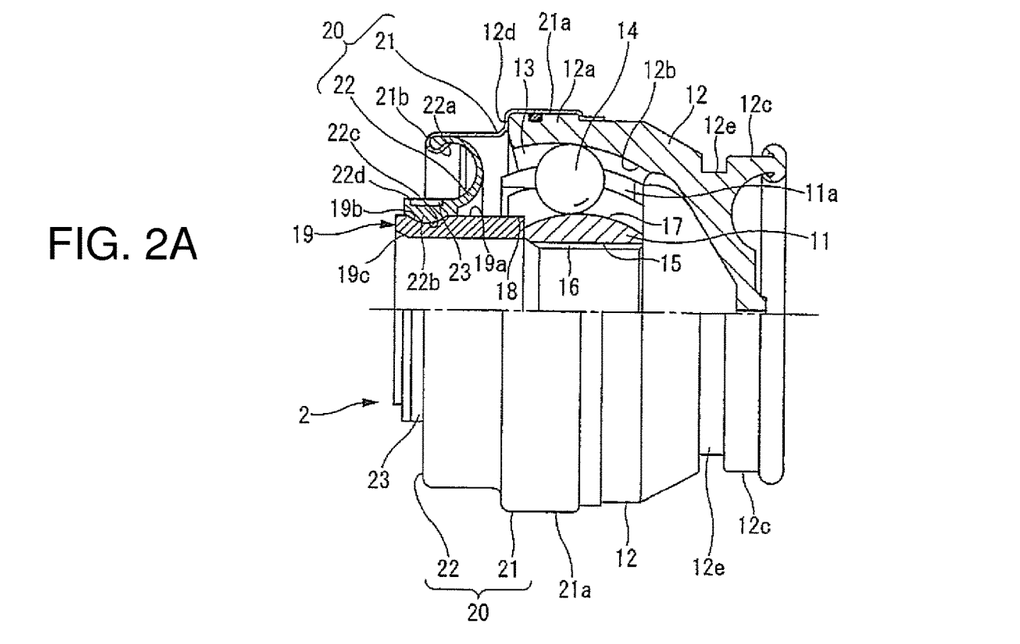
FIG. 2A is a side view, which shows a partial section of one constant-velocity joint in the first embodiment.
Figure 2B:
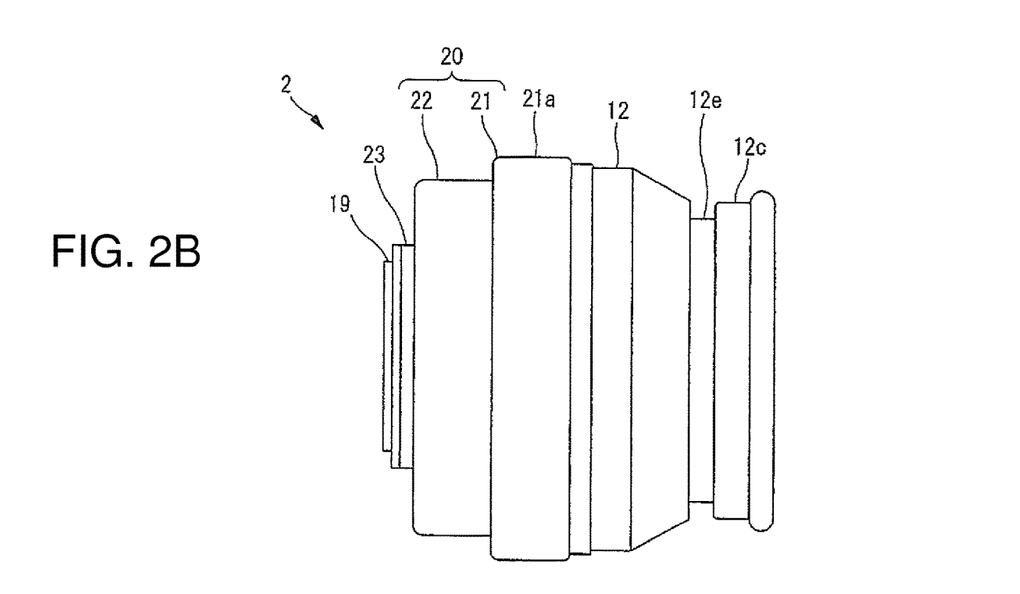
FIG. 2B is a side view of the joint.

As shown in FIG. 2, the first constant-velocity joint 2 is equipped with an inner ring member 11 getting inputted rotational torque from the input shaft by spline-combining with the input shaft; an outer ring member 12 housing the inner ring member 11; and balls 14. The balls 14 are rollingly held through a cage 11a of the inner ring member 11 in raceway grooves 13 which are formed at prescribed intervals in a circumferential direction in the outer ring member 12, and which extend along an axial direction, thereby being capable of transmitting rotational torque between the members 11 and 12.

The inner ring member 11 is formed of iron-based metal and formed into a nearly annular shape. Furthermore, the inner ring member 11 has an insertion hole 15 formed in an internal axial direction. In an inner circumferential surface of the insertion hole 15, a female spline 16 with which a male spline of the input shaft engages from the axial direction is formed along the axial direction. Furthermore, an outer circumferential surface 17 on which each ball 14 rolls is formed into an arc surface. Additionally, though not shown in FIG. 2, an annular holding groove which a circlip of the input shaft fits into and engages with is formed in the further tip side from the center of the inner circumferential surface (the female spline 16) of the insertion hole 15, that is, in the side close to the drive shaft 3. The circlip and the holding groove make a positioning of the input shaft in the axial direction possible.

Furthermore, the inner ring member 11 has a groove 18 for press fitting at one end of the axial direction in the input shaft side. A cylindrical part 19 into which the male spline of the above input shaft is inserted is integrally pressed in and fixed in this groove 18 for press fitting. The cylindrical part 19 is formed of iron-based metal material and formed so as to jut out in the input shaft direction by prescribed length. In a front end side of an outer circumferential surface 19a of the cylindrical part 19, a fitting groove 19b which fits an inner circumferential part 22b of a boot 22 (described later) is formed. An inner circumferential edge 19c of the tip side of the cylindrical part 19 is formed so as to be a taper shape to well insert a small diameter part of an input shaft having the male spline thereinto.

The outer ring member 12 is formed of aluminum alloy material and formed into a cup-like shape. In the outer ring member 12, an outer circumferential surface of its tip part has a fitting projecting part 12a which has an annular shape. Furthermore, an inner circumferential surface 12b is formed into an arc surface so as to be capable of swing as a whole through the raceway grooves 13 and the balls 14.

The minimum diameter part 12c of the outer ring member 12 is combined with one end of the drive shaft 3 by friction welding. In its inside, a seal cap (not shown) which has a disk shape is fixed by press fitting. Further, a boot member 20 is installed in the front end part 12d side of the maximum diameter part of the outer ring member 12. The boot member 20 seals up a front end opening part of the outer ring member 12 between the front end part 12d and the cylindrical part 19 of the inner ring member 11. Grease filling between the inner ring member 11 and the outer ring member 12 is retained by the boot member 20 and the seal cap.

Furthermore, in an outer circumferential surface of the outer ring member 12 which is located in a range avoiding positions corresponding to the raceway grooves 13, concretely, in an outer circumferential surface of the minimum diameter part 12c which is the thickest in the outer ring member 12, an engagement groove 12e, which is formed over the whole circumference, is formed. The engagement groove 12e is formed so as to engage with an engage member (not shown) which is applied to operations of engagement and release between the male spline and the female spline 16 in assembling and dismantling the propeller shaft 1.

The boot member 20 is composed of a retainer 21 in the outer ring member 12 side; and a boot 22 integrally fixed on the tip end part of the retainer 21.

The retainer 21 is formed into a cylindrical shape having a stepped diameter by a metal plate. A body part 21a, which is bended and formed so as to have a crank-like cross section, is fit and fixed in the fitting projecting part 12a of the outer ring member 12. Furthermore, an outer circumferential part 22a of the boot 22 is crimped and fixed on the inside of the tip end part 21b, which is bended and formed so as to have a turned down shape.

The boot 22 is formed of rubber material or synthetic resin material and integrally formed so that its cross section is a lateral U-shape jutting out the ball 14 side. Furthermore, the boot 22 has the outer circumferential part 22a fixed on the retainer 21 and an annular inner circumferential part 22b formed so as to have a nearly rectangular cross section. In the inner circumferential part 22b, a fitting projecting part 22c which fit into the fitting groove 19b of the cylindrical part 19 is integrally formed. Furthermore, the inner circumferential part 22b is fastened on the outer circumference of the cylindrical part 19 by a boot band 23 wound on a bottom face of an annular band groove 22d which is formed on the outer circumference of the boot 22.

Further, the first constant-velocity joint 2 can change an angle in a range of a predetermined angle though it is a fixed type. Furthermore, the second constant-velocity joint 4 is formed so as to be capable of expanding and contracting in the axial direction by prescribed length in both ends. Therefore, that facilitates an assembling property when the propeller shaft 1 is installed in a car body.

Figure 3:
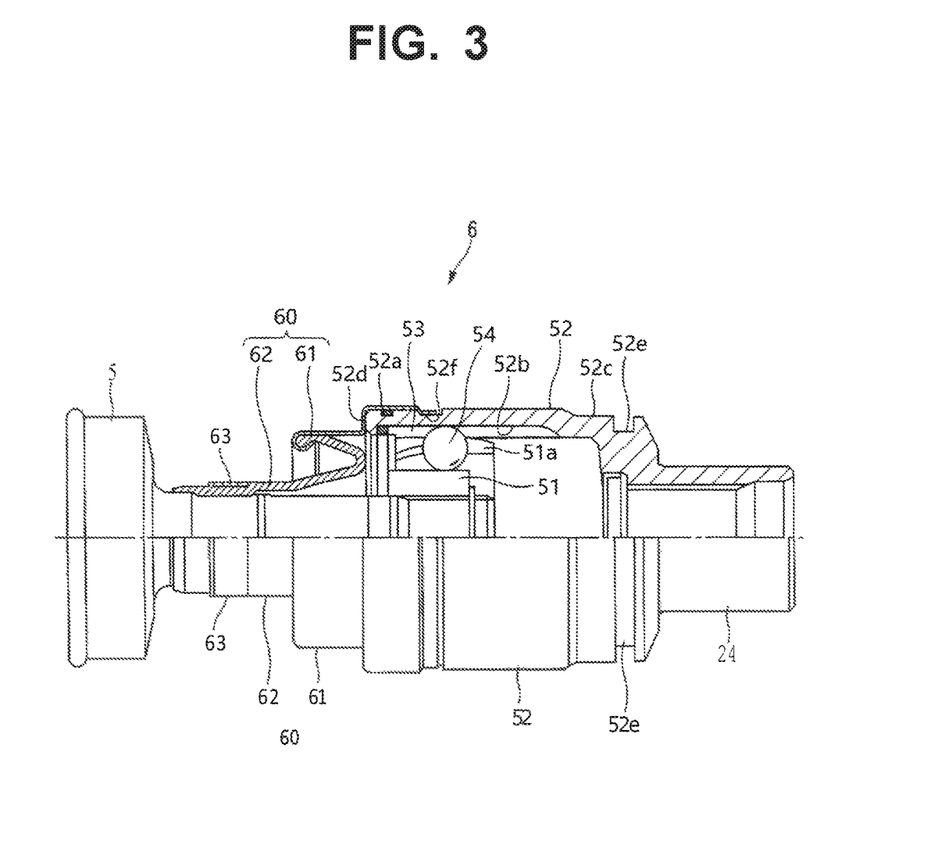
FIG. 3 is a side view, which shows a partial section of the other constant-velocity joint in the first embodiment.
Figure 4A:
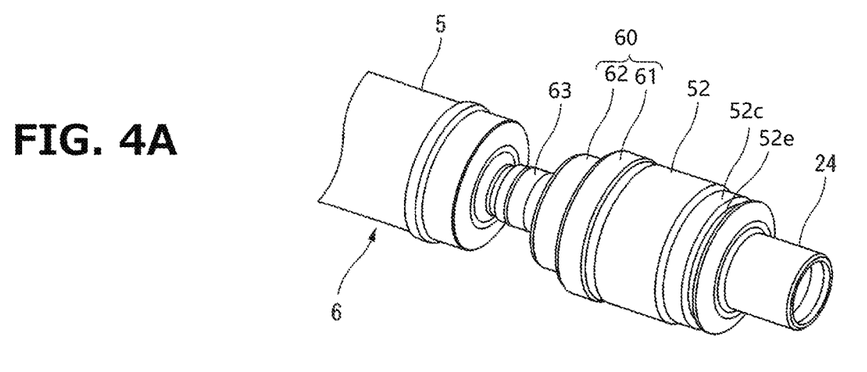
FIG. 4A is a perspective view, which shows the other constant-velocity joint connected to a power transmission shaft.
Figure 4B:
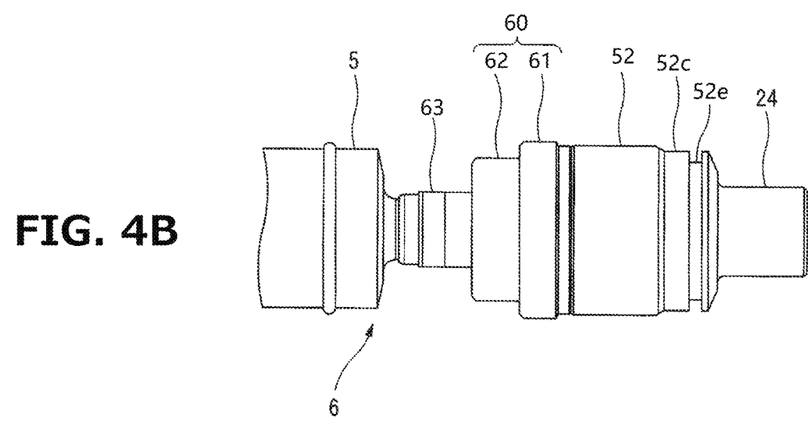
FIG. 4B is a side view of the joint.

The third constant-velocity joint 6 shown in FIG. 3 and FIG. 4 has substantially the same structure as the first constant-velocity joint 2 except that the inner ring member 11 is formed into a cylindrical shape; that the outer ring member 12 and the boot 22 are longer than those of the first constant-velocity joint 2 in size; that the raceway groove 13 in the outer ring member 12 is longer than that of the first constant-velocity joint 2 in total length; that a fitting groove 12f which fits the body part 21a of the retainer 21 is formed on the outer circumferential surface of the outer ring member 12; and that a cylindrical part 24 whose outer diameter is smaller than the minimum diameter part 12c of the outer ring member 12 is integrally installed at one end of the outer ring member 12 opposite to the driven shaft 5.

(Effects of the Present Embodiment)

Effects of the first constant-velocity joint 2 and the third constant-velocity joint 6 will be explained.

In an assembly process of a car body, the first constant-velocity joint 2 and the input shaft are connected by the following basic processes. That is, in the state that the joint 2 is supported by fitting a fitting member (not shown) into the fitting groove 12e of the first constant-velocity joint 2 shown in FIG. 2, a small diameter part of the input shaft is inserted into the cylindrical part 19 of the inner ring member 11 of the joint 2 from the axial direction. Thereby, the circlip of the input shaft deforms so as to reduce its diameter against its own elastic force in the diametrically expanding direction while making its outer circumferential edge slidingly contact with the inner circumferential surface of the cylindrical part 19. When the input shaft is inserted while maintaining the reduced diameter state, from the middle of the insertion, the male spline of the input shaft and the female spline 16 of the first constant-velocity joint 2 insert each other while receiving slight insertion loads.

Then, the circlip of the input shaft maintains the reduced diameter state while slidingly contacting on the female spline 16, and a small diameter part of the input shaft is inserted to the maximum position in the cylindrical part 19. Furthermore, when it reaches a holding groove in the inner ring member 11, its diameter is expanded by elastic return force. Thereby, the circlip fits into and engagingly locks in the holding groove. The circlip in this fitting state is in a state that its diameter is not perfectly expanded but slightly reduced. That is, it is in a state that spring force is maintained. As the circlip is brought into elastic contact with the holding groove in the state, the small diameter part of the input shaft can be held in the insertion hole 15 of the inner ring member 11.

Hereby, the input shaft and the first constant-velocity joint 2 are connected by pressure engagement of the female spline and the female spline 16 in the axial direction, connected by elastic fitting force of the circlip to the holding groove wherein the elastic force acts in a radial direction, and configured so that unexpected detachment from the cylindrical part 19 of the input shaft is restricted.

Therefore, as the input shaft and the first constant-velocity joint 2 are connected by the combination of the male spline and the female spline 16, the circlip, and the holding groove, it is possible to obtain a firm connection without a bolt and to certainly transmit input torque from the input shaft to the drive shaft 3 side.

In case of separating the input shaft and the first constant-velocity joint 2 in order to carry out maintenance of the first constant-velocity joint 2, etc., by inserting a tip of a removing tool (not shown) into a gap between a front end surface of a large-diameter part of the input shaft and a tip edge of the cylindrical part 19 of the first constant-velocity joint 2 and by operating the tool to have the gap opened from the axial direction with the principle of leverage, the input shaft is moved in the pull-out direction. Thereby, it is possible to release the connection of the input shaft and the first constant-velocity joint 2.

In connection of the driven shaft 5 and the third constant-velocity joint 6 and release thereof, they are conducted in the same way as those of the input shaft and the first constant-velocity joint 2.

As described above, the first constant-velocity joint 2 and the third constant-velocity joint 6 of the present embodiment have the engagement groove 12e which engages with an engage member to release a spline connection between the input shaft and the inner ring member 11 in the range avoiding the positions corresponding to the raceway grooves 13 in the axial direction or the circumferential direction of the outside wall of the outer ring member 12. In this way, as the engagement groove 12e is formed at the position avoiding the raceway grooves 13, it is possible to suppress an increase in weight of the first constant-velocity joint 2 and the third constant-velocity joint 6 while obtaining strength of the constant-velocity joints. Thereby, it is possible to suppress an increase in weight of the propeller shaft 1 which is equipped with the constant-velocity joints 2 and 6.

Furthermore, as the boot member 20 is installed in one end side of the outer ring member 12 and the engagement groove 12e is formed in the other end side of the outer ring member 12, the engagement groove 12 is far from the boot member 20. Thereby, it is possible to suppress damage of the boot member 20 caused by the engagement member.

Especially, the engagement groove 12e is formed as a whole-circumferential groove which is formed over the whole circumference in the position avoiding the raceway grooves 13 in the axial direction of the outside wall of the outer ring member 12. According to this mode, the constant-velocity joints 2 and 6 are more lightened, so assembly workability of the propeller shaft 1 is improved.

Furthermore, as the engagement groove 12e is formed on the minimum diameter part 12c of the outside wall of the outer ring member 12, it is possible to avoid interference between the engagement member and a floor in a vehicle side in assembly work of the vehicle.

Furthermore, this minimum diameter part 12c is configured so as to connect to the drive shaft 3. That is, it is a mode that the drive shaft 3 is connected to the minimum diameter part 12c without diameter expansion of the minimum diameter part 12c, so that facilitates a handling of the engagement member.

[Second Embodiment]

Figure 5A:
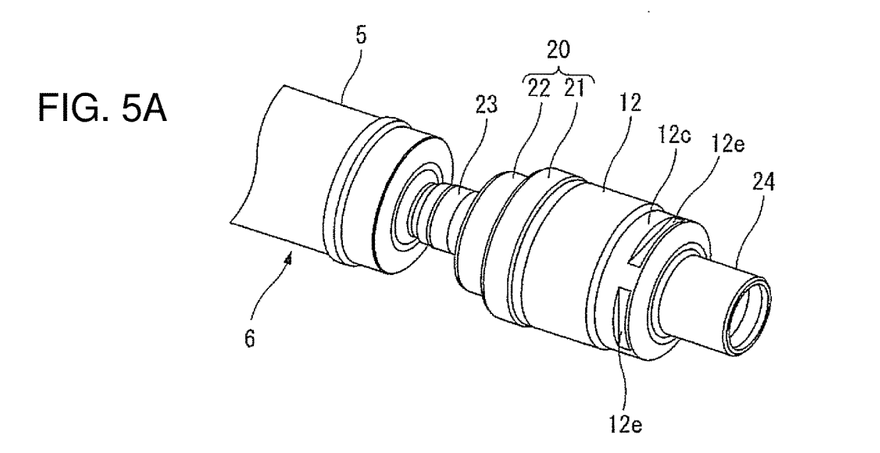
FIG. 5A is a perspective view, which shows the constant-velocity joint in the second embodiment, which is connected to a power transmission shaft.
Figure 5B:
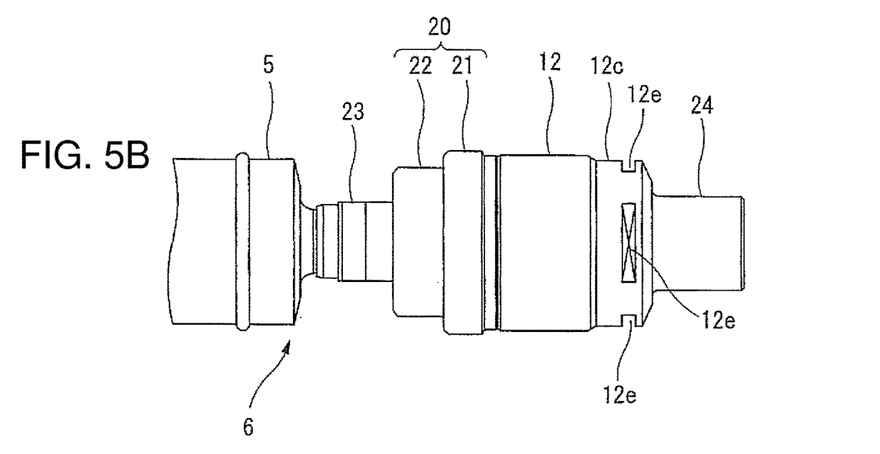
FIG. 5B is a side view of the joint.
Figure 6A:
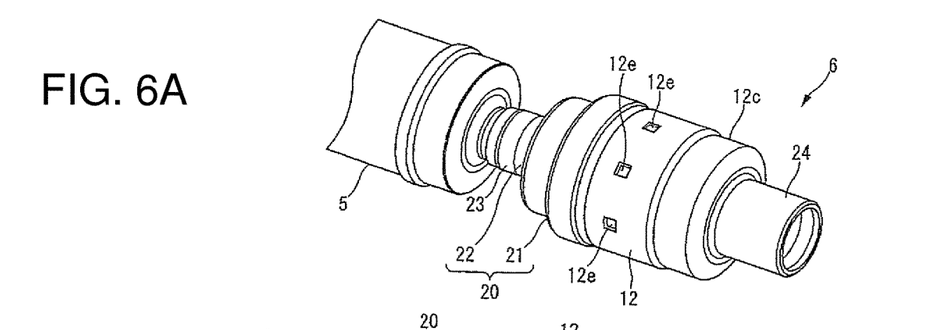
FIG. 6A is a perspective view, which shows the constant-velocity joint in the third embodiment, which is connected to a power transmission shaft.
Figure 6B:
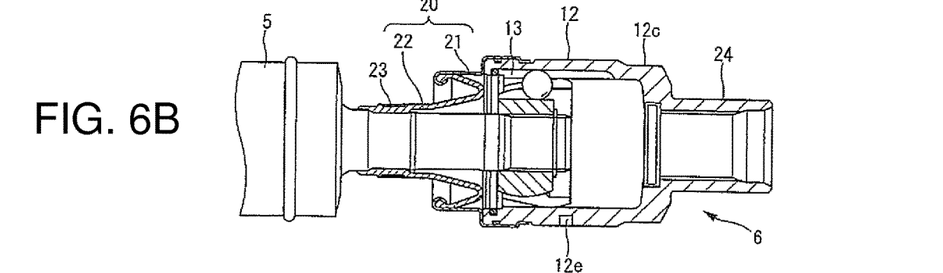
FIG. 6B is a cross-sectional view taken along the line B-B of the joint.
Figure 6C:
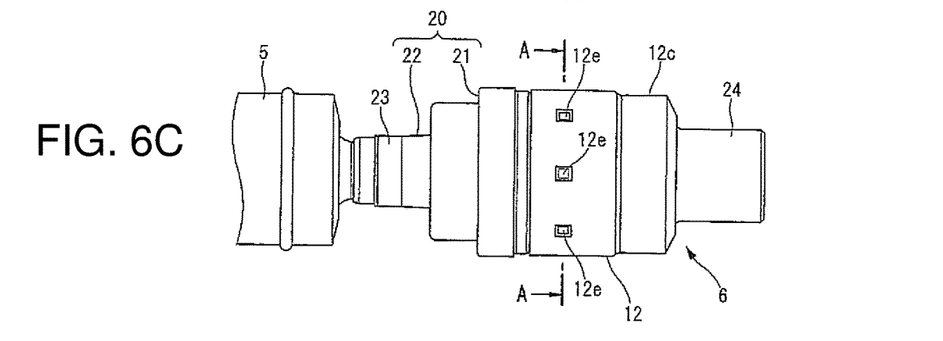
FIG. 6C is a side view of the joint.
Figure 6D:
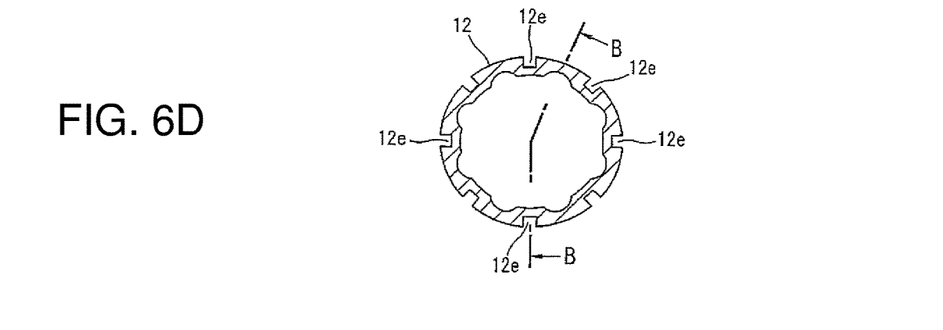
FIG. 6D is a cross-sectional view taken along the line A-A of the joint.

The third constant-velocity joint 6 in the second embodiment shown in FIG. 5 has the same structure as that of the third constant-velocity joint 6 in the first embodiment except that the engagement grooves 12e, which function as locking parts where the engagement member engages, are partially formed in the circumferential direction at the position avoiding the raceway grooves 13 in the axial direction of the outside wall of the outer ring member 12 in the minimum diameter part 12c of the outer ring member 12.

In this embodiment, it is obvious that the same effects of the first constant-velocity joint 2 in the first embodiment can be obtained. Especially, as the engagement grooves 12e are partially formed in the circumferential direction of the outside wall of the outer ring member 12, the third constant-velocity joint 6 is lightened. Furthermore, as the engagement grooves 12e are partially formed in the range avoiding the positions corresponding to the raceway grooves 13 in the outer circumference of the outside wall of the outer ring member 12, the engagement grooves 12e are arranged while avoiding the thinnest part of the third constant-velocity joint 6. Therefore, strength of the joint 6 is further secured.

[Third Embodiment]

The third constant-velocity joint 6 in the third embodiment shown in FIG. 6 also has a structure that the engagement grooves 12e, which function as locking parts where teeth of the engagement member engage wherein the teeth are eight-teeth type and are applied in assembling or dismantling the propeller shaft 1, are partially formed in the circumferential direction in the range avoiding the positions corresponding to the raceway grooves 13 in the axial direction of the outside wall of the outer ring member 12.

Especially, the engagement grooves 12e are smaller than those of the second embodiment. Although the engagement grooves 12e are arranged near to the boot member 20 in the outside wall of the outer ring member 12, it may be arranged in the minimum diameter part 12c of the outer ring member like that of the second embodiment.

According to this mode, a plurality of the engagement grooves 12e is formed in the range avoiding the positions corresponding to the raceway grooves 13 in the circumferential direction of the outside wall of the outer ring member 12 and is arranged along the circumferential direction of the outside wall of the outer ring member 12. Therefore, it is possible to fulfill strength securing and weight reduction of the third constant-velocity joint 6.

[Fourth Embodiment]

Figure 7A:
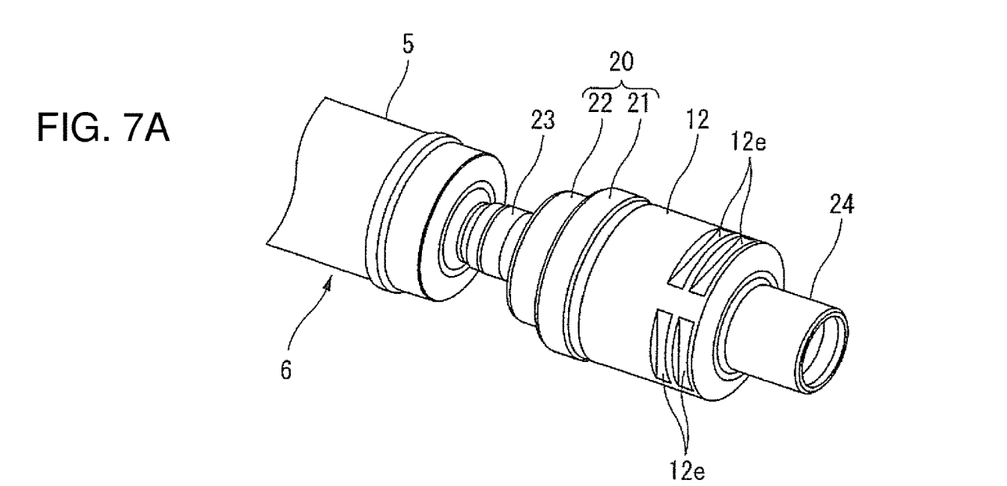
FIG. 7A is a perspective view, which shows the constant-velocity joint in the fourth embodiment, which is connected to a power transmission shaft.
Figure 7B:
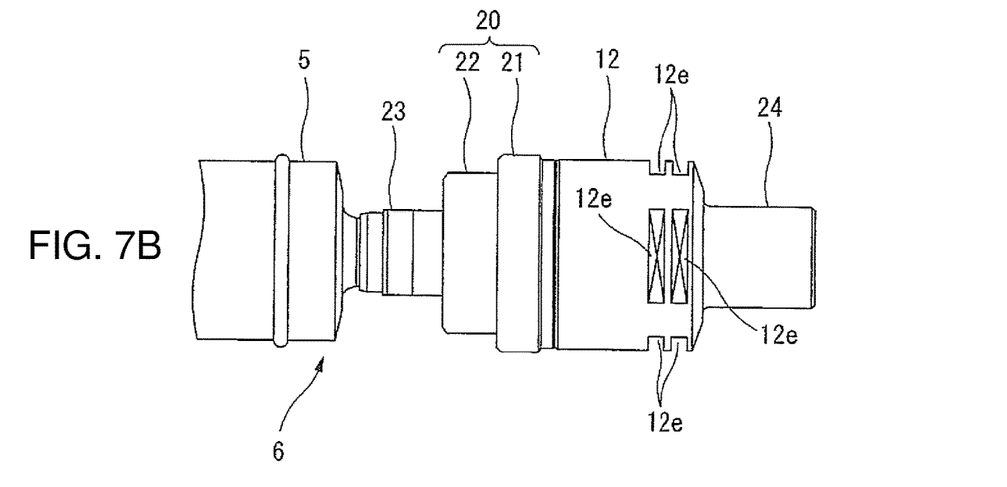
FIG. 7B is a side view of the joint.

The third constant-velocity joint 6 in the fourth embodiment shown in FIG. 7 has the same structure as that of the third constant-velocity joint 6 of the second embodiment except that it doesn't have the minimum diameter part 12c in the second embodiment, and that the engagement grooves 12e in FIG. 5 are formed in a plurality of lines in the axial direction of the outside wall of the outer ring member 12.

According to this mode, as the engagement grooves 12e are formed in a plurality of lines in the axial direction of the outside wall of the outer ring member 12, the joint 6 can be further lightened in addition to the effects of the second embodiment. Thereby, assembly workability of the propeller shaft 1 is also further improved.

[Fifth Embodiment]

Figure 8A:
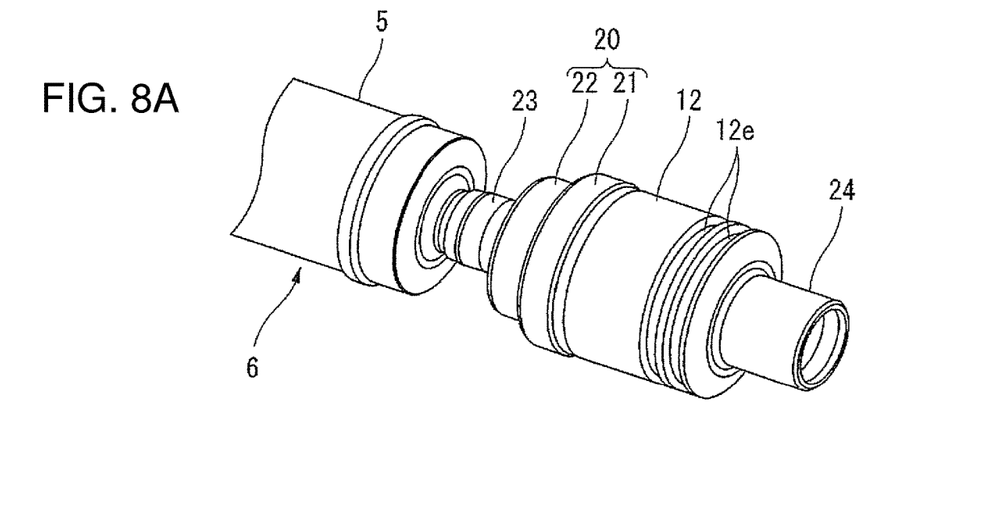
FIG. 8A is a perspective view, which shows the constant-velocity joint in the fifth embodiment, which is connected to a power transmission shaft.
Figure 8B:
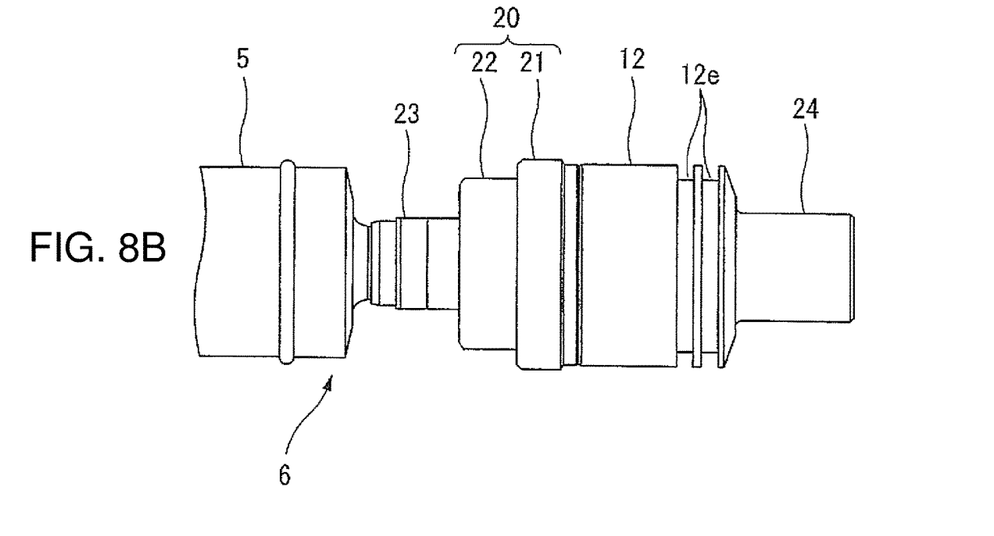
FIG. 8B is a side view of the joint.

The third constant-velocity joint 6 in the fifth embodiment shown in FIG. 8 has the same structure as that of the third constant-velocity joint 6 of the fourth embodiment except that the engagement grooves 12e which are whole-circumferential grooves are formed in a plurality of lines along the axial direction in the range avoiding the positions corresponding to the raceway grooves 13 in the axial direction of the outside wall of the outer ring member 12.

According to this mode, as the engagement groove 12e which are whole-circumferential grooves are arranged in a plurality of lines along the axial direction of the outside wall of the outer ring member 12, in addition to the effects of the fourth embodiment, the third constant-velocity joint 6 is further lightened and assembly workability of the propeller shaft 1 is also further improved.

[Sixth Embodiment]

Figure 9A:
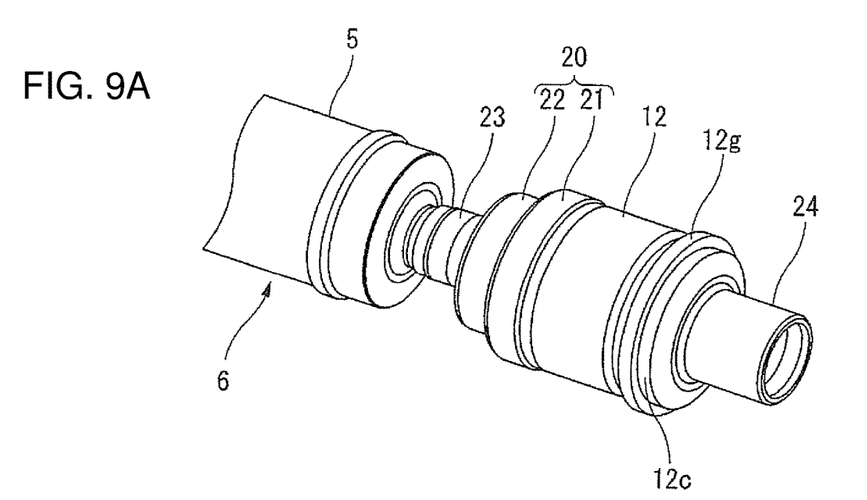
FIG. 9A is a perspective view, which shows the constant-velocity joint in the sixth embodiment, which is connected to a power transmission shaft.
Figure 9B:
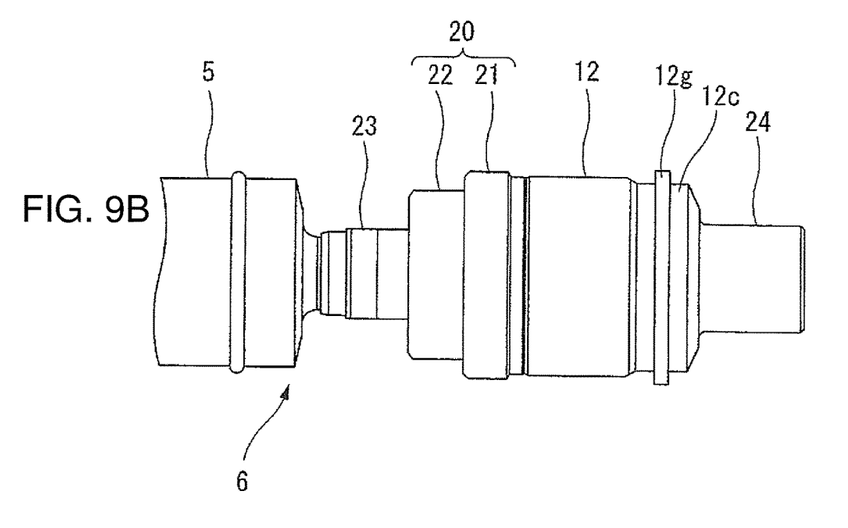
FIG. 9B is a side view of the joint.

The third constant-velocity joint 6 in the sixth embodiment shown in FIG. 9 has the same structure as that of the third constant-velocity joint 6 of the first embodiment except that an engagement projected part 12g, which engages with an engagement member applied in assembling or dismantling the propeller shaft 1, is formed instead of the engagement groove 12e. The engagement projected part 12g is formed in the range avoiding the positions corresponding to the raceway grooves 13 in the outer circumferential wall of the outer ring member 12.

According to this mode, as the engagement projected part 12g is arranged in a minimum required position in the outer circumferential wall of the outer ring member 12, it is possible to suppress increase in weight of the third constant-velocity joint 6 and the propeller shaft 1 provided therewith. Furthermore, as the engagement projected part 12g is far from the boot member 20, it is possible to suppress damage of the boot member 20 caused by the engagement projected part 12g.

[Seventh Embodiment]

Figure 10:
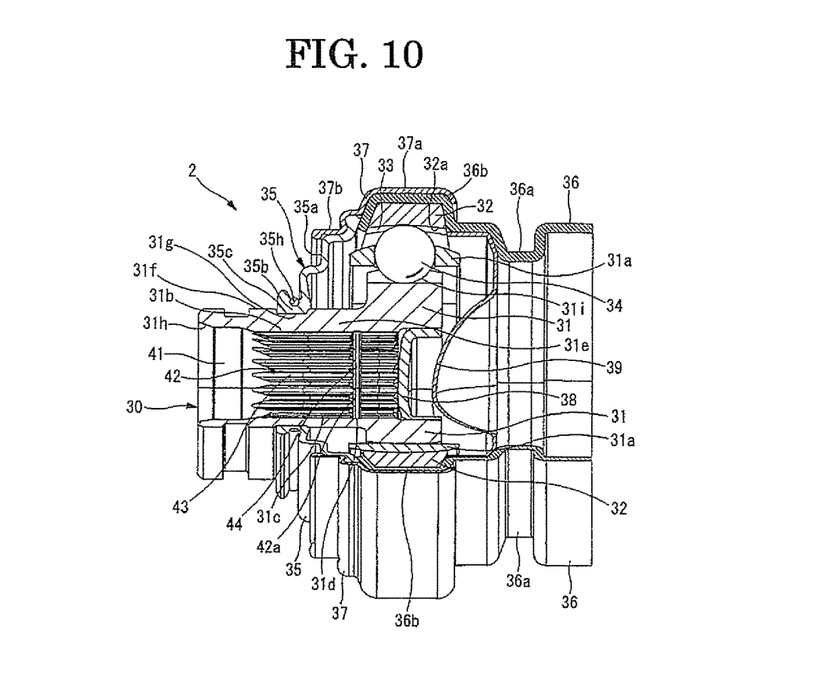
FIG. 10 is a side view, which shows a partial section of the constant-velocity joint in the seventh embodiment.

The first constant-velocity joint 2 in the seventh embodiment shown in FIG. 10 is equipped with an inner ring member 31, an outer ring member 32, balls 34, a boot 35, a tube 36, and a retainer 37. The inner ring member 31 gets inputted rotational torque from an input shaft 30 by spline-combining with the input shaft 30. The outer ring member 32 houses the inner ring member 31. The balls 34 are rollingly held through a cage 31a of the inner ring member 31 in raceway grooves 33 which are formed at prescribed intervals in a circumferential direction in the outer ring member 32, and which extend along an axial direction. Thereby, it is capable of transmitting the rotational torque between the members 31 and 32. The boot 35 is installed in one end side of the outer ring member 32 and seals up an inside of the outer ring member 32. The tube 36 houses the outer ring member 32. The retainer 37 joins to the boot 35 and the tube 36.

The input shaft 30 is formed so as to have a stepped diameter in one end part and equipped with a middle diameter part 41 and a small diameter part 42. The middle diameter part 41 is integrally connected to an end part of a large diameter part (not shown) which is connected with a transmission. The small diameter part 42 is integrally connected to an end part of the middle diameter part 41.

The small diameter part 42 is formed so as to be comparatively longer in the axial direction than the middle diameter part 4. In a whole of its outer circumferential surface, a male spline 43 is formed along the axial direction. In an outer circumference of a tip of the small diameter part 42, an annular groove 42a is formed. Furthermore, a circlip 44, which fits into and engages with a holding groove 31d of the inner ring member 31 by elastic return force, is fit into the annular groove 42a.

The inner ring member 31 is formed of iron-based metal and formed into a nearly annular shape. Furthermore, the inner ring member 31 has an insertion hole 31b formed in an internal axial direction. In an inner circumferential surface of the insertion hole 31b, a female spline 31c with which a male spline 43 of the input shaft 30 engages from the axial direction is formed along the axial direction. Furthermore, an outer circumferential surface 31i in which each ball 34 rolls is formed into an arc surface. Additionally, though not shown in FIG. 10, an annular holding groove 31d which the circlip 44 of the input shaft 30 fits into and engages with is formed in the further tip side from the center of the inner circumferential surface (the female spline 51) of the insertion hole 31b, that is, in the side close to the tube 36. The circlip 44 and the holding groove 31d make a positioning of the input shaft 30 in the axial direction possible.

In one end part in the axial direction of the input shaft 30 side the inner ring member 31, a cylindrical part 31e whose maximum outer diameter is smaller than an outer diameter of the inner ring member 31 is integrally installed coaxially with the inner ring member 31. On the other hand, in an opening part in one end part in the axial direction of the tube 36 side of the inner ring member 31, a seal cap 38 is fit.

The cylindrical part 31e is formed so as to jut out in a direction of the input shaft 30 by prescribed length. In a front end side of an outer circumferential surface 31f of the cylindrical part 31e, a fitting groove 31g which fits an inner circumferential part 35b of the boot 35 (described later) is formed. An inner circumferential edge 31h of the tip side of the cylindrical part 31e is formed so as to be a taper shape to well insert a small diameter part 42 of the input shaft 30 thereinto.

The outer ring member 32 is formed of aluminum alloy material and formed into a cup-like shape. An inner circumferential surface 32a of the outer ring member 32 is formed into an arc surface so as to be capable of swing as a whole through the raceway grooves 33 and the balls 34. The outer ring member 32 is fit on an inner circumferential surface of an engagement projecting part 36b of the tube 36. Furthermore, an opening part in the tube 36 side of the outer ring member 32 is sealed up by a seal cap 39 which is fit in the tube 36.

The boot 35 is formed of rubber material or synthetic resin material and formed so as to be a cylindrical shape having a stepped diameter. Furthermore, the boot 35 has the outer circumferential part 35a fit in the retainer 37 and an annular inner circumferential part 35b formed so as to have a nearly rectangular cross section. In the inner circumferential part 35b, a fitting projecting part 35c which fit into the fitting groove 31g of the cylindrical part 31e of the inner ring member 31 is integrally formed. Furthermore, the inner circumferential part 35b is fastened on the outer circumference of the cylindrical part 31e by a boot band 35h wound on a band groove which is formed on the outer circumference of the boot 35. Grease filling between the inner ring member 31 and the outer ring member 32 is retained by the boot 35 and the seal cap 39.

The retainer 37 is formed into a cylindrical shape having a stepped diameter by a metal plate. A body part 37*a*, which is bended and formed so as to have a crank-like cross section, is fit and fixed on an outer circumferential surface of the fitting projecting part 36*b* of the tube 36. Furthermore, an outer circumferential part 35*a* of the boot 35 is crimped and fixed on the inside of the tip end part 37*b*, which is bended and formed so as to have a turned down shape.

The tube 36 has an engagement groove 36*a* and an engagement projecting part 36*b*. The engagement groove 36*a* is a whole circumferential groove formed so as to engage with an engage member (not shown) which is applied to the operations of engagement and release between the male spline 43 and the female spline 31 in assembling and dismantling the propeller shaft 1. The engagement projecting part 36*b* engages with both an outer circumferential surface of the outer ring member 32 and an inner circumferential surface of the body part 37*a* of the retainer 37. The engagement groove 36*a* and the engagement projecting part 36*b* are formed by press-forming. The engagement groove 36*a* is arranged in the range avoiding the positions corresponding to the raceway grooves 33 of the outer ring member 32 on the outer circumferential surface of the tube 36. When the outer ring member 32 is housed in the tube 36, the seal cap 39 is fitted in the inner circumferential surface between the engagement groove 36*a* and the engagement projecting part 36*b*.

According to this mode, as the engagement groove 36 is formed in the tube 36, it is no longer necessary that an engagement groove which engages with the engagement member is formed in the outer ring member 32. Therefore, it is possible to suppress an increase in weight of the first constant-velocity joint 2 and the propeller shaft 1 equipped therewith while obtaining strength of the member 32.

Furthermore, as the engagement groove 36*a* and the engagement projecting part 36*b* are formed by press-forming of the tube 36, it is possible to reduce a manufacturing cost of the propeller shaft 1 equipped with the first constant-velocity joint 2 in the present embodiment.

[Eighth Embodiment]

Figure 11:
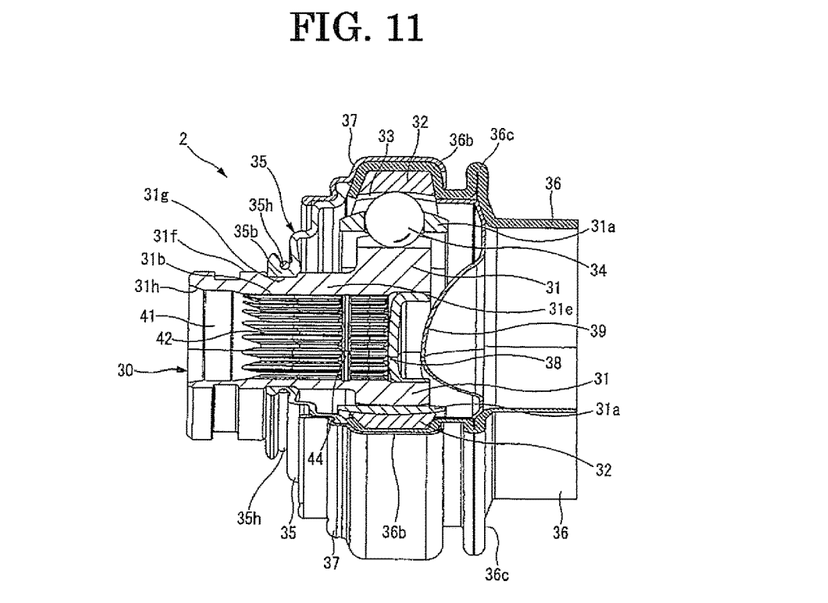
FIG. 11 is a side view, which shows a partial section of the constant-velocity joint in the eighth embodiment.

The first constant-velocity joint 2 in the eighth embodiment shown in FIG. 11 has the same structure as that of the first constant-velocity joint 2 of the seventh embodiment except that an engagement projected part 36*c*, which engages with the engagement member, is formed instead of the engagement groove 36*a*. The engagement projected part 36*c* is also arranged and formed in the range avoiding the positions corresponding to the raceway grooves 33 of the outer ring member 32 on the outer circumferential surface of the tube 36 as well as the engagement groove 36*a*. In this mode, it is obvious that the same effects of the first constant-velocity joint 2 of the seventh embodiment can be obtained.

[Ninth Embodiment]

Figure 12:
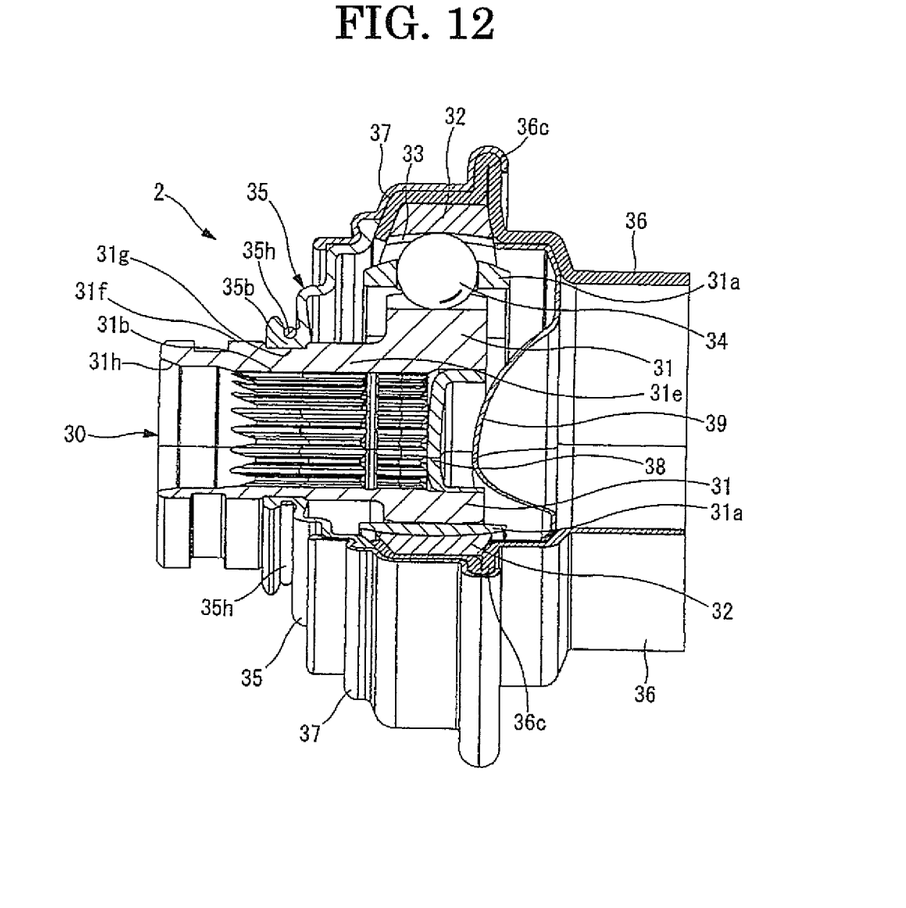
FIG. 12 is a side view, which shows a partial section of the constant-velocity joint in the ninth embodiment.

The first constant-velocity joint 2 in the ninth embodiment shown in FIG. 12 has the same structure as that of the first constant-velocity joint 2 of the eighth embodiment except that the engagement projected part 36*c* is arranged and formed in a position corresponding to a circumferential edge of the tube 36 side of the outer ring member 32. In this mode, it is obvious that the same effects of the first constant-velocity joint 2 of the seventh embodiment can be obtained.

According to this invention, as the engagement recesses are formed in the position avoiding the raceway grooves in the axial direction of the outside wall of the outer ring member and formed in a plurality of lines along the axial direction, that fulfills strength securing and weight reduction of the constant-velocity joint of the propeller shaft. Furthermore, that improves assembly workability of the propeller shaft equipped with the constant-velocity joint.

According to this invention, as the whole-circumferential grooves are formed in the range avoiding the positions corresponding to the raceway grooves in the outer ring member of the constant-velocity joint and formed in a plurality of lines along the axial direction, that fulfills strength securing and weight reduction of the constant-velocity joint. Furthermore, that improves assembly workability of the propeller shaft equipped with the constant-velocity joint.

According to this invention, as the engagement groove, which engages with an engagement member applied to spline connection and release thereof, is formed in the minimum diameter part of the outside wall of the outer ring member, it is possible to avoid interference between the engagement member and a floor in a vehicle side.

According to this invention, the power transmission shaft is connected to the minimum diameter part without diameter expansion of the minimum diameter part, so that facilitates a handling of the engagement member.

According to this invention, as the engagement grooves are partially formed in the range avoiding the positions corresponding to the raceway grooves in the circumferential direction of the outer ring member, that fulfills strength securing and weight reduction of the constant-velocity joint equipped with the outer ring member. Furthermore, that improves assembly workability of the propeller shaft equipped with the constant-velocity joint.

According to this invention, as the engagement groove is formed in the range avoiding the positions corresponding to the raceway grooves in the circumferential direction of the outside wall of the outer ring member, that fulfills strength securing and weight reduction of the constant-velocity joint equipped with the outer ring member. Furthermore, that improves assembly workability of the propeller shaft equipped with the constant-velocity joint.

According to this invention, as the engagement grooves are formed in the range avoiding the positions corresponding to the raceway grooves of the member in the axial direction of the outside wall of the outer ring member and formed in a plurality of lines along the axial direction, weight reduction of the constant-velocity joint is fulfilled. Furthermore, assembly workability of the propeller shaft equipped with the constant-velocity joint is improved.

According to this invention, as the engagement groove is formed in the range avoiding the positions corresponding to the raceway grooves of the outer ring member of the constant-velocity joint in the axial direction or the circumferential direction of the tube member, that fulfills strength securing and weight reduction of the constant-velocity joint.

According to this invention, as the engagement projected part is formed in the range avoiding the positions corresponding to the raceway grooves of the outer ring member of the constant-velocity joint in the axial direction or the circumferential direction of the tube member, that fulfills strength securing and weight reduction of the constant-velocity joint.

According to this invention, as the engagement groove or the engagement projected part is formed by press-forming of the tube member, it is possible to reduce a manufacturing cost of the constant-velocity joint.

The invention claimed is:

1. A propeller shaft for an automobile, comprising:
   a constant-velocity joint including:
      an inner ring member;
      an outer ring member housing the inner ring member; and
      intermediate members which are installed in raceway grooves that are formed at prescribed intervals in a circumferential direction in the outer ring member, and that extend along an axial direction, and which are configured to transmit rotational torque between the inner ring member and the outer ring member; and
   a power transmission shaft that is one of a drive shaft and a driven shaft connected to the constant-velocity joint,
   wherein the constant-velocity joint is configured so that one of the inner ring member and the outer ring member is spline-connected to an attaching member that is one of an input shaft connected to a transmission of the automobile and an output shaft connected to a differential gear,
   wherein the outer ring member includes a large diameter part, a small diameter part and an engagement recess,
   wherein the large diameter part is formed in a range overlapping with the raceway grooves in a rotation axial line of the outer ring member, and is attached with a boot,
   wherein the small diameter part is formed in a range not overlapping with the raceway grooves, is formed such that an outer diameter of the small diameter part, which is a length in a radial direction with respect to the rotation axial line, is smaller than that of the large diameter part, is connected to the large diameter part on an opposite side to a side on which the boot is provided in a direction of the rotation axial line, and is formed to have a thickness thicker than a thickness of the large diameter part in the radial direction with respect to the rotation axial line, and
   wherein an outer circumferential surface of the small diameter part defines the engagement recess, the engagement recess being recessed in the radial direction of the small diameter part, and configured to facilitate connection and disconnection of the constant-velocity joint and the attaching member, at a time of operation of the propeller shaft.

2. The propeller shaft as claimed in claim 1, wherein the engagement recess is a whole-circumferential groove formed over the whole circumference in the range avoiding the positions corresponding to the raceway grooves in the axial direction of the outside wall of the outer ring member.

3. The propeller shaft as claimed in claim 1, wherein in the outer ring member, the outer diameter of the large diameter part which is a length in the radial direction with respect to the rotation axial direction is a maximum outer diameter.

4. The propeller shaft as claimed in claim 1, wherein the power transmission shaft is connected in the small diameter part.

5. The propeller shaft as claimed in claim 1, wherein the engagement recesses are locking parts formed in the range avoiding the positions corresponding to the raceway grooves in the axial direction of the outside wall of the outer ring member and partially formed along the circumferential direction.

6. The propeller shaft as claimed in claim 1, wherein the engagement recess is a locking groove formed in the range avoiding the positions corresponding to the raceway grooves in the circumferential direction of the outside wall of the outer ring member.

7. The propeller shaft as claimed in claim 1, wherein the engagement recesses are locking parts formed in the position avoiding the raceway grooves in the axial direction of the outside wall of the outer ring member and formed in a plurality of lines along the axial direction.

8. The propeller shaft as claimed in claim 1, wherein the engagement recesses are whole-circumferential grooves formed in the range avoiding the positions corresponding to the raceway grooves in the axial direction of the outside wall of the outer ring member and formed in a plurality of lines along the axial direction.

9. A constant-velocity joint for an automobile comprising:
   an inner ring member;
   an outer ring member housing the inner ring member; and
   intermediate members which are installed in raceway grooves that are formed at prescribed intervals in a circumferential direction in the outer ring member, and that extend along an axial direction, and which are transmit rotational torque between the inner ring member and the outer ring member;
   wherein the constant-velocity joint is configured so that one of the inner ring member and the outer ring member is spline-connected to an attaching member that is one of an input shaft connected to a transmission of the automobile and an output shaft connected to a differential gear,
   wherein the outer ring member includes a large diameter part, a small diameter part and an engagement groove,
   wherein the large diameter part is formed in a range overlapping with the raceway grooves in a rotational axial line of the outer ring member, and is attached with a boot,
   wherein the small diameter part is formed in a range not overlapping with the raceway grooves, is formed such that an outer diameter of the small diameter part, which is a length in a radial direction with respect to the rotation axial line, is smaller than that of the large diameter part, is connected to the large diameter part on an opposite side to a side on which the boot is provided in a direction of the rotation axial line, and is formed to have a thickness thicker than a thickness of the large diameter part in the radial direction with respect to the rotation axial line, and
   wherein an outer circumferential surface of the small diameter part defines the engagement groove, the engagement groove being recessed in the radial direction of the small diameter part, and configured to facilitate connection and disconnection of the constant-velocity joint and the attaching member, at a time of operation of the constant-velocity joint.

10. The constant-velocity joint as claimed in claim 9, wherein the engagement groove is a whole-circumferential groove formed over the whole circumference in the range avoiding the positions corresponding to the raceway grooves in the axial direction of the outside wall of the outer ring member.

11. The constant-velocity joint as claimed in claim 9, wherein in the outer ring member, the outer diameter of the large diameter part which is a length in the radial direction with respect to the rotation axial direction is a maximum outer diameter.

12. The constant-velocity joint as claimed in claim 9, wherein the power transmission shaft is connected in the small diameter part.

13. The constant-velocity joint as claimed in claim 9, wherein the engagement grooves are locking parts formed in the range avoiding the positions corresponding to the raceway grooves in the axial direction of the outside wall of the outer ring member and partially formed along the circumferential direction.

14. The constant-velocity joint as claimed in claim 9, wherein the engagement groove is a locking groove formed in the range avoiding the positions corresponding to the raceway grooves in the circumferential direction of the outside wall of the outer ring member.

15. The constant-velocity joint as claimed in claim 9, wherein the engagement grooves are formed in the range avoiding the positions corresponding to the raceway grooves in the axial direction of the outside wall of the outer ring member and formed in a plurality of lines along the axial direction.

\* \* \* \* \*